United States Patent [19]

Souza et al.

[11] Patent Number: 4,570,517

[45] Date of Patent: Feb. 18, 1986

[54] SELF-INTERLOCKING SPLIT SAW BLADE

[76] Inventors: John A. Souza; Ross P. Souza, both of 2509-B 11th Ave., Eugene, Oreg. 97402

[21] Appl. No.: 647,163

[22] Filed: Sep. 4, 1984

[51] Int. Cl.[4] .............................................. B27B 33/08
[52] U.S. Cl. ........................................ 83/838; 83/666; 83/676; 83/698
[58] Field of Search ................................. 83/835–855, 83/664, 665, 666, 676, 698; 30/347; 407/52, 30, 31; 125/15; 51/206.4, 206.5; 144/231, 236, 237

[56] References Cited

U.S. PATENT DOCUMENTS

| 6,580 | 7/1849 | Philips | 83/838 |
|---|---|---|---|
| 21,651 | 10/1858 | Carpenter | 83/838 |
| 390,034 | 9/1888 | Peckover | 407/52 X |
| 1,526,861 | 2/1925 | Manderscheid | 51/206.4 |
| 3,899,955 | 8/1975 | Selch | 83/665 X |
| 4,267,759 | 5/1981 | Sullivan et al. | 83/665 |

FOREIGN PATENT DOCUMENTS 1250254   9/1967   Fed. Rep. of Germany ........ 83/664

Primary Examiner—James M. Meister
Attorney, Agent, or Firm—John F. Ingman

[57] ABSTRACT

A circular saw blade, having been divided into two sections to permit rapid replacement without having to be removed past the end of the saw arbor, is reconnected and self-interlocked to its own body, thus eliminating any requirement for machined collars or studs for retention or alignment. Interlocking is accomplished by the use of interlocking projections and corresponding recesses in various configurations on the two sections of the split saw blade.

1 Claim, 8 Drawing Figures

SELF-INTERLOCKING SPLIT SAW BLADE

BACKGROUND OF THE INVENTION

1. Field of the Invention

The present invention generally relates to circular saw blades, and more particularly, is concerned with split circular saw blades which are aligned and joined by self-interlocking projections and recesses.

2. Description of the Prior Art

In many lumber mill operations, a "gang saw" is used, wherein a number of circular saw blades are attached to a single rotating shaft or arbor, in order to make multiple cuts on a single pass of the wood being cut. As many as fifty or more circular saw blades could be used on a single arbor. In order to replace a single circular saw blade, it initially was necessary to remove any blades to the outside of that blade, so that the blade being replaced could be slipped off of the end of the arbor. This process was time consuming and created unnecessary wear on the arbor. Subsequently, quick change "split saws" were developed where the circular saw blade was cut in half. These blades were directly replaceable at any position on the gang arbor by loosening their means of attachment to the arbor and removing the two pieces constituting the split blade.

While the advent of the split saw blade improved efficiency due to the reduction in time required to replace individual saw blades, it also resulted in significantly increased costs for both the saw blades themselves and the means of attachment to the arbors. One system modified the blades with a machined collar which fit into a circular recess machined into the back plate affixed to the arbor. Another design provided for multiple holes in each blade section which fit over studs attached to the back plate. These systems were expensive because of the machining required and often lacked the accuracy necessary for precise alignment of the blades on the arbor. In order to gain a measure of universality, some blades were manufactured with both a collar and stud holes.

There remains a need for a saw blade design which can find universal use on standard arbors, but with the advantage of the quick change split saws. Needed is a design which removes the recess collars on the arbor back plate and the collar ribs on saw blades, and eliminates the need for holes in the blades and the special machining of arbors. Also needed are saw blades which can be used on either left or right hand arbors, and which are easier to maintain than the current blades. And, finally, a split saw blade system which cost less to manufacture is needed.

SUMMARY OF THE INVENTION

The present invention provides a self-interlocking split circular saw blade which is designed to satisfy the aforementioned needs. The invention embodies an improved circular split saw blade which interlocks with its own body by means of projections and recesses.

Accordingly, the present invention provides a circular saw blade which has been "split" into two sections in order to encircle the saw arbor for rapid emplacement and removal, and which is reconnected and self-interlocked to itself own body to provide an aligned and strong circular saw blade without the need for especially designed and machined collars or stud holes in the blades, or collar recesses and studs on the arbor back plates. The interlocking is accomplished by projections and corresponding recesses in the two sections of the split circular blade, which projections and recesses are designed to interlock accurately so as to provide needed strength and improved alignment for circular split saws at a reduced cost.

DESCRIPTION OF THE PREFERRED EMBODIMENT

Figure 1A:
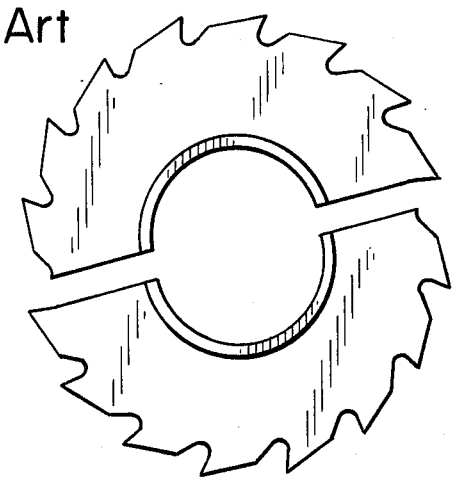
FIG. 1 illustrates prior art in split saw blades.
Figure 1B:
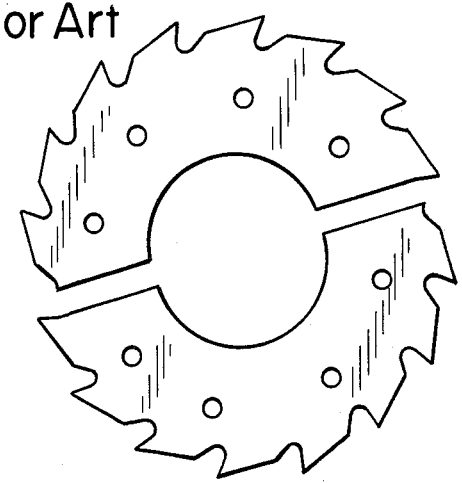

Referring now to the drawings, and more particularly to FIG. 1, there is shown prior art in split circular saw blades. FIG. 1a shows, in perspective, a split saw blade with a machined collar, the collar fitting into a machined collar recess in the arbor back plate (not shown) to provide alignment and to keep the split saw from detaching itself from the arbor due to centrifugal force. FIG. 1b shows, in perspective, a split saw blade with holes located for alignment with studs located on the arbor back plate, so as also to provide alignment and restraint against centrifugal force.

Figure 2:
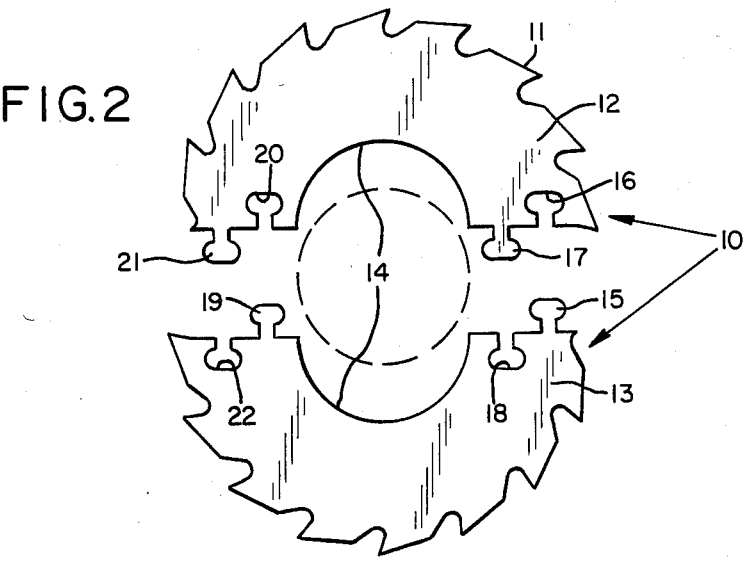
FIG. 2 is an elevation view of the preferred embodiment of the self-interlocking split saw blade.

Referring to FIG. 2, there is shown the self-interlocking split saw blade, generally designated 10, which comprises the preferred embodiment of the invention. The saw blade 10 basically includes teeth 11, of varying design depending on the use of the blade, around the circular circumference thereof; the two halves 12 and 13 of the blade, which are of the same size and shape; a curved inner circumference 14 which fits about and encircles the saw's arbor; and interlocking projections 15, 17, 19, and 21, which, when the two sections of the split saw blade 12 and 13 are joined, fit and connect with the recesses 16, 18, 20, and 22 respectively. It should be noted that the split saw blade sections will only fit together, around the arbor, in a single manner, that is, projection 15 fits into recess 16, projection 17 fits into recess 18, projection 19 fits into recess 20 and projection 21 fits into recess 22. This is particularly important in saw blades which have directional teeth, such as blades for cutting wood, so as to prevent erroneous assembly wherein the teeth of the two sections would point in opposite directions. Such a feature is less important in cannery, masonary, meat blades or other circular saw blades where directional teeth are not of concern. It should be noted that while this invention is described primarily in terms of wood cutting saw blades, the scope thereof is intended to apply to all variations of circular saw blades, regardless of the intended use thereof or the material being cut.

Figure 3A:
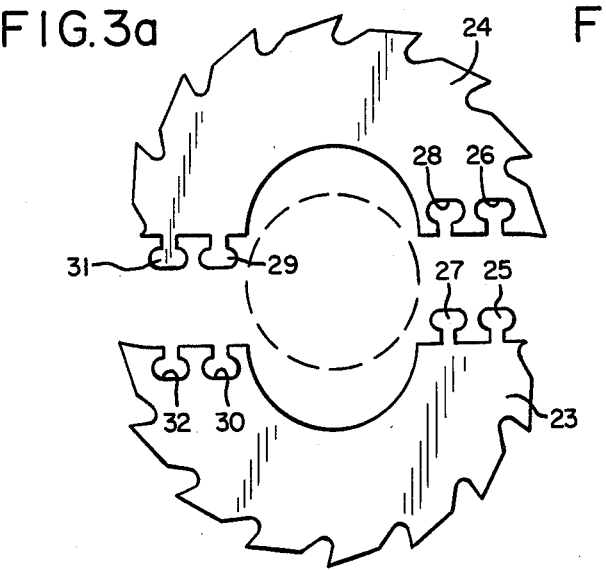
FIG. 3 is an elevation view of alternative interlocking configurations of the saw blade of FIG. 2.
Figure 5:
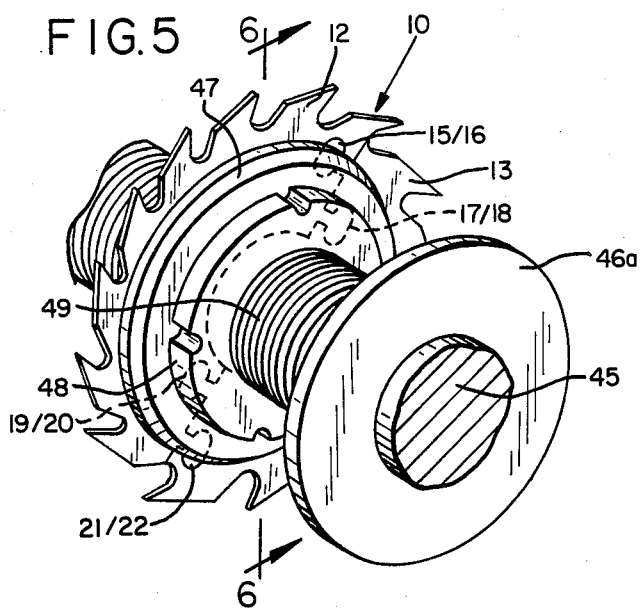
FIG. 5 illustrates the preferred embodiment of FIG. 2 in perspective, as assembled on an arbor.
Figure 6:
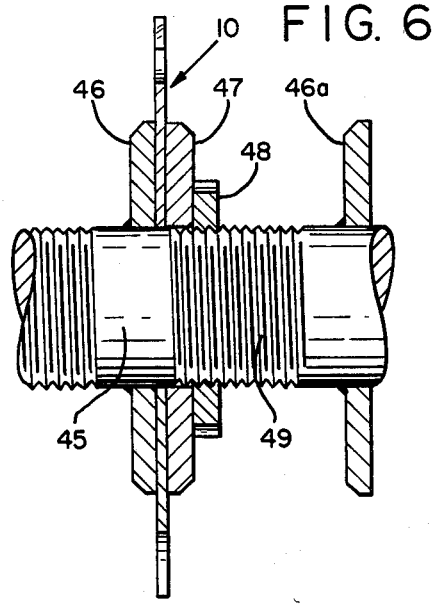
FIG. 6 is a partial sectional view taken on line 6—6 of FIG. 5 looking in the direction indicated by the arrows.

FIG. 3 shows alternative configurations of the self-interlocking split saw blade. While the preferred embodiment in FIG. 2 shows, on a single split saw blade section, alternating projections and recesses, the alternative shown in FIG. 3a illustrates, on a single split saw blade section 23, two (2) projections 25 and 27 adjacent on one connecting edge and two recesses 30 and 32 adjacent on the the other connecting edge of that split saw blade section. As can be seen when split saw blade section 23 is interlocked with split saw blade section 24, projection 25 engages with recess 26, projection 27 engages recess 28, projection 29 engages recess 30 and projection 31 engages recess 32. As in the preferred embodiment, there is no possibility of misjoining the two split saw sections. The alternative specifically illustrated in FIG. 3a would be of advantage to a clockwise rotating saw blade wherein the projections would always trail the rotation, and thus be less likely to gouge the material being cut should misalignment occur. Of course, depending on the configuration used, if the back plate 46 and the face plate 47, as illustrated in FIG. 5 and FIG. 6, cover the projections, then no gouging could occur.

Figure 3B:
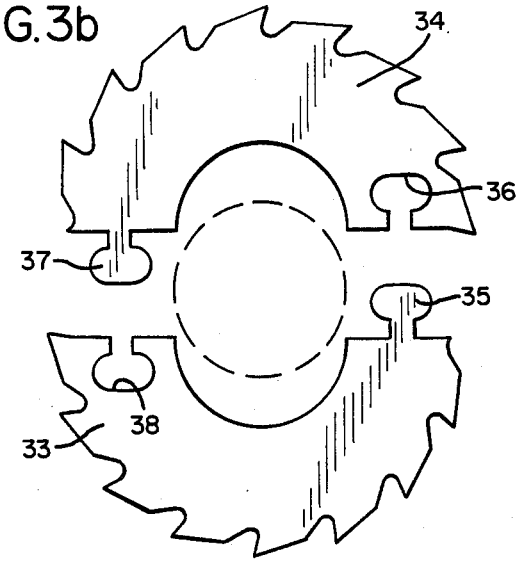

FIG. 3b shows a still different alternative for interlocking the split saw blades. In this figure, only a single interlocking projection and recess is provided for each saw blade section, so that, as illustrated, saw blade section 33 has projection 35 and recess 38, while saw blade section 34 has projection 37 and recess 36, wherein, upon assembly, projection 35 engages recess 36 and projection 37 engages recess 38. Again, in this alternative configuration, erroneous joining of the the blade sections has been eliminated by the positioning of the projections and recesses.

FIG. 3a and FIG. 3b illustrate that the specific number of projections and recesses utilized to interlock the split saw blade sections together is not critical to the invention. While four interlocking sets of projections and recesses are illustrated in the preferred embodiment in FIG. 2, this being believed to be an optimum trade-off between redundancy and simplicity of manufacture, clearly a greater number of sets of projection and recesses are within the scope of the invention, depending upon the particular saw configuration, as is evident to a person skilled in the art.

The interlocking of the various projections with their corresponding recesses, as noted above, provides the interlocked joining of two sections of split circular saw blades with each other to provide strength sufficient to restrain the saw sections from parting under the centrifugal movement of the rotating saw blade, and the accuracy of alignment necessary for true running of the saw.

Accuracy in the manufacture of interlocking split saw blade sections with projections and recesses, as appropriate, can be expected to approach a tolerance of two one-thousands of an inch (0.002 inch) through the use of current state-of-the-art laser cutting techniques. Such preciseness not only will allow the use of matched pairs of split saw blades, but also the free substituting of other split saw blade sections of the same type.

Figure 4:
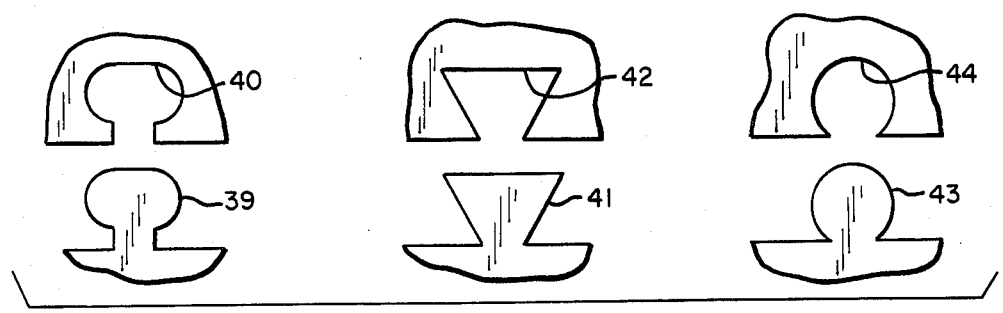
FIG. 4 are enlarged views of examples of interlocking projections and recesses used with the self-interlocking split saw blades shown in FIG. 2 and 3.

FIG. 4 illustrates enlarged views of examples of various individual projections and recesses which can be utilized with this invention. There are innumerable possible geometric designs for the interlocking members, and while the preferred embodiment of FIG. 2 and the alternatives of FIG. 3 show a single design of interlocking projections and recesses, the design of such projections and recesses are readily interchangeable. As described previously, the projections and recesses are located respectively on the split saw blade sections so as to eliminate the possibility of erroneous assembly of the blade sections. Similiarly, various designs of interlocking projections and recesses would have the purpose of preventing the assembly of different types of cutting blades sections together in the same circular saw blade. Thus, for example, as illustrated in FIG. 4, projection 39 and recess 40 could be reserved for general purpose saw blades, projection 41 and recess 42 could apply to crosscut saw blades, while projection 43 and recess 44 might be appropriate for blades for ripping lumber. Other examples of individual projections and corresponding recesses which could be associated with particular applications of circular saw blades are within the scope of the person skilled in the art.

Finally, FIG. 5 and FIG. 6 illustrate the preferred embodiment of FIG. 2, as it could be assembled (other blades not shown) on a gang arbor 45. There are numerous methods of assembling a gang saw, this being only an example. Split saw blade sections 12 and 13 are interlocked through the joining of projections 15, 17, 19, and 21 with recesses 16, 18, 20, and 22, as illustrated. The self-interlocked split saw blade 10 is placed against the back plate 46 affixed to the arbor 45, and the face plate 47 is subsequently pressed against the saw blade 10 by a threaded nut 48 turned on the threads 49 until it is tight. Thus, blade 10, composed of the two interlocked split saw blade sections 12 and 13, is held accurately and securely for the rapid rotation and cutting action of the saw. It should be noted that no costly machining of collars and recesses, or studs and their holes, are required. In this example, similar assemblies of back plate 46, self-interlocking circular split saw blade sections 12 and 13, face plate 47 and threaded nut 48 would be found in sequence on the gang arbor 45. Back plate 46a illustrates the position of an adjacent back plate where another self-interlocking split saw blade could be mounted.

It is thought that the self-interlocking split saw of the present invention and many of it attendant advantages will be understood from the foregoing description and that it will be apparent that various changes may be made in form, construction and arrangement of the parts thereof without departing from the spirit and scope of the invention or sacrificing all of its material advantages, the form hereinbefore described being merely an exemplary embodiment thereof.

I claim:

1. A circular saw blade, held securely on a rotating arbor, comprising:
   (a) two (2) semicircular saw blade sections, in combination comprising a circular saw blade, each section being flat, and having as edges an outer cutting semicircle, a smaller inner semicircle, concave in shape with a diameter corresponding to the diameter of the arbor, and two connecting edges, each extending from said inner semicircle to the said outer cutting semicircle; and
   (b) means for interlocking the said two (2) semicircular saw blade sections together to form a single circular saw blade, said interlocking means comprising:
      multiple interlocking projections and recesses on said connecting edges of each said semicircular saw blade section to receive the correspondingly shaped interlocking projections and recesses on said connecting edges of the other semicircular blade section so as to connect and self-interlock during operation and yet be readily capable of lateral disassembly to permit rapid replacement when needed without having to be removed past the end of the saw arbor;
      said semicircular saw blade sections, with projections and recesses, being identically shaped to provide for full and complete interchangeability of said semicircular saw blade sections.

* * * * *